United States Patent [19]

Pitts, Jr. et al.

[11] 4,229,769

[45] Oct. 21, 1980

[54] FACSIMILE SYSTEM

[75] Inventors: Robert W. Pitts, Jr., Houston, Tex.; Ronald G. Gillespie, Old Tappan, N.J.

[73] Assignee: Texaco Inc., White Plains, N.Y.

[21] Appl. No.: 967,326

[22] Filed: Dec. 7, 1978

[51] Int. Cl.² .................... H04N 1/04; H04N 1/36; H04N 1/00; H04N 1/24

[52] U.S. Cl. .................... 358/285; 358/264; 358/266; 358/272; 358/294

[58] Field of Search ............... 358/256, 264, 285, 266, 358/272, 294

[56] References Cited

U.S. PATENT DOCUMENTS

| | | | |
|---|---|---|---|
| 3,443,028 | 5/1969 | Pavlik | 358/256 |
| 3,848,087 | 11/1974 | Carrell | 358/264 |
| 3,943,529 | 3/1976 | Feldman et al. | 358/256 |
| 3,997,722 | 12/1976 | Bardos | 358/285 |

*Primary Examiner*—Robert L. Griffin
*Assistant Examiner*—Edward L. Coles
*Attorney, Agent, or Firm*—Carl G. Ries; Robert A. Kulason; Ronald G. Gillespie

[57] ABSTRACT

A facsimile system includes a transmitter having a light source, which provides pulses of light, scans an original copy. The pulses of light impinge on the copy during each scan. A light responsive device spacially related to the copy receives pulses of light from the copy in accordance with the copy, and provides electrical pulses. A circuit in the transmitter provides output signals in accordance with the electrical pulses from the device. A pulse source in the transmitter provides synchronization pulses. The system also includes a receiver which has a network receiving the output signals and the synchronization pulses. The network provides electrical data pulses in accordance with the received output signals and electrical synchronization pulses in accordance with the received synchronization pulses. A control circuit connected to the network provides a control signal in accordance with the data pulses from the network. A laser in the receiver scans light sensitive material and provides pulses of light which strike the material in accordance with the control signal. The receiver further includes apparatus for developing material so as to provide a printed copy of the original copy.

15 Claims, 28 Drawing Figures

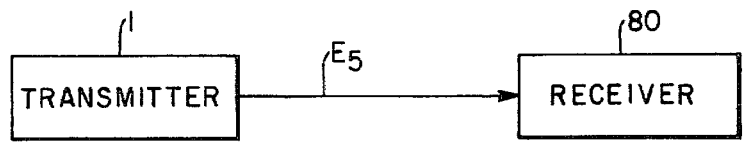
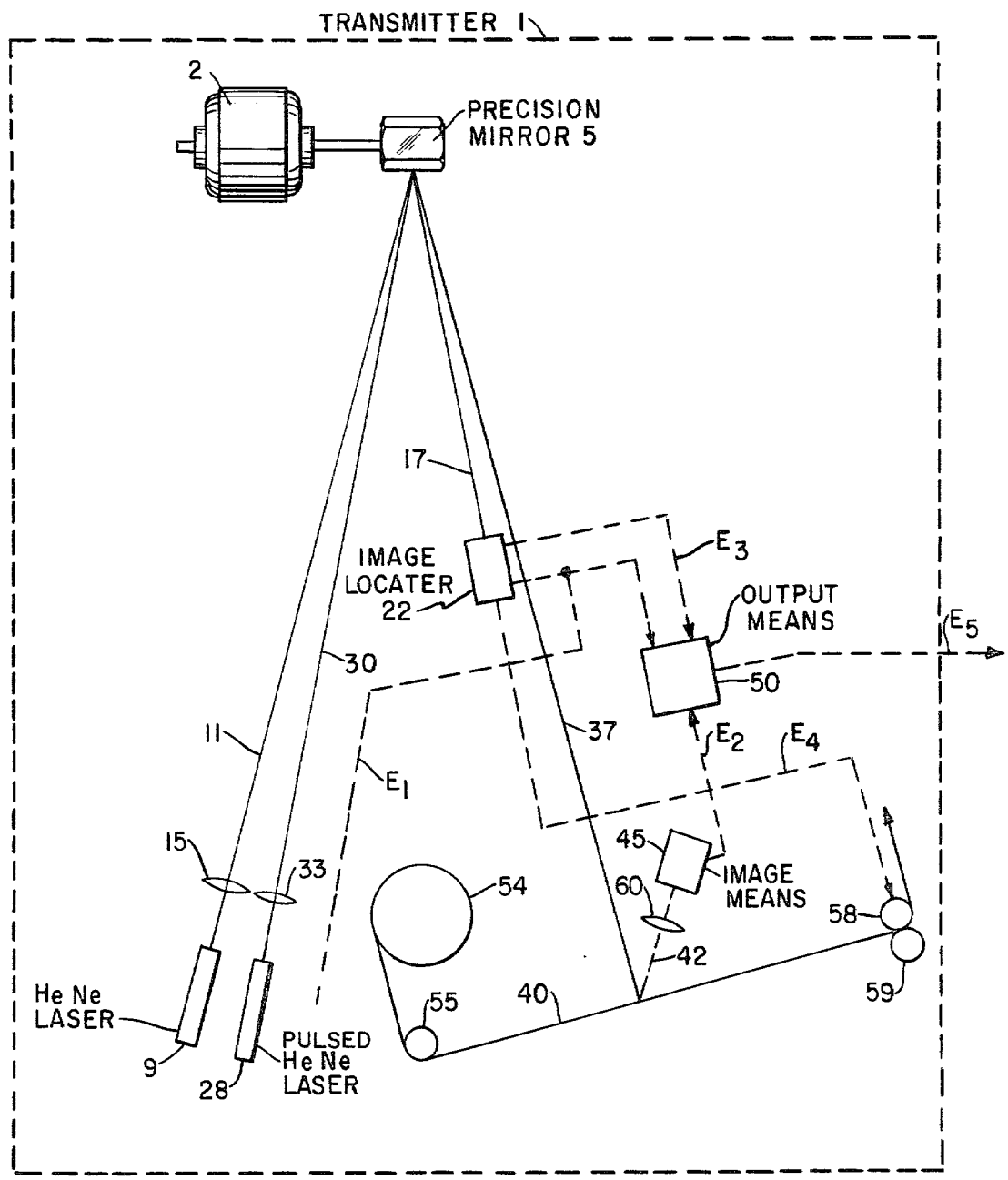

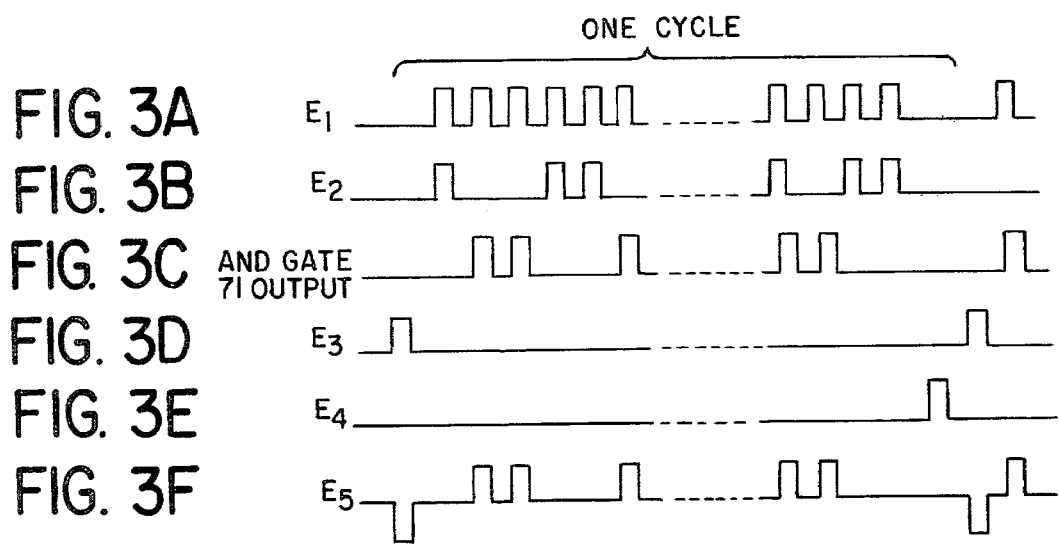
FIG. 3A
FIG. 3B
FIG. 3C  AND GATE 71 OUTPUT
FIG. 3D
FIG. 3E
FIG. 3F
FIG. 4
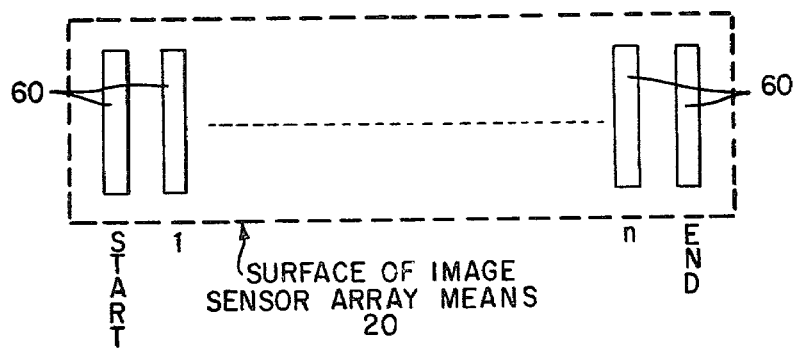
FIG. 5
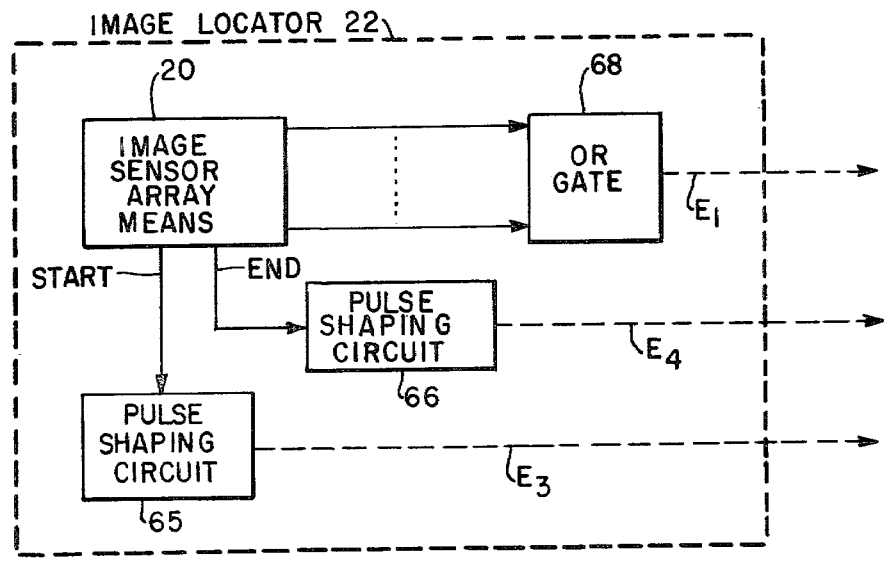

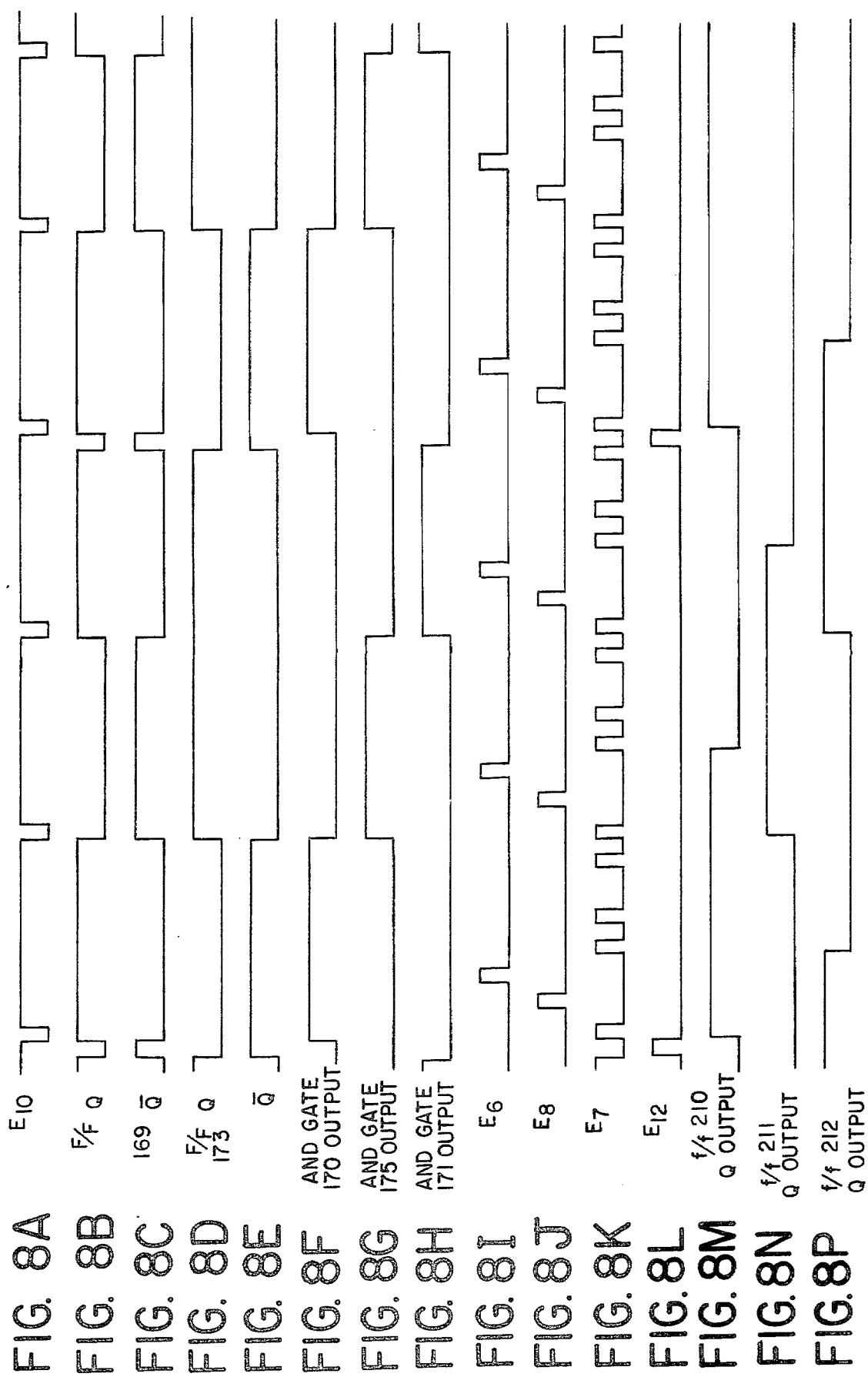

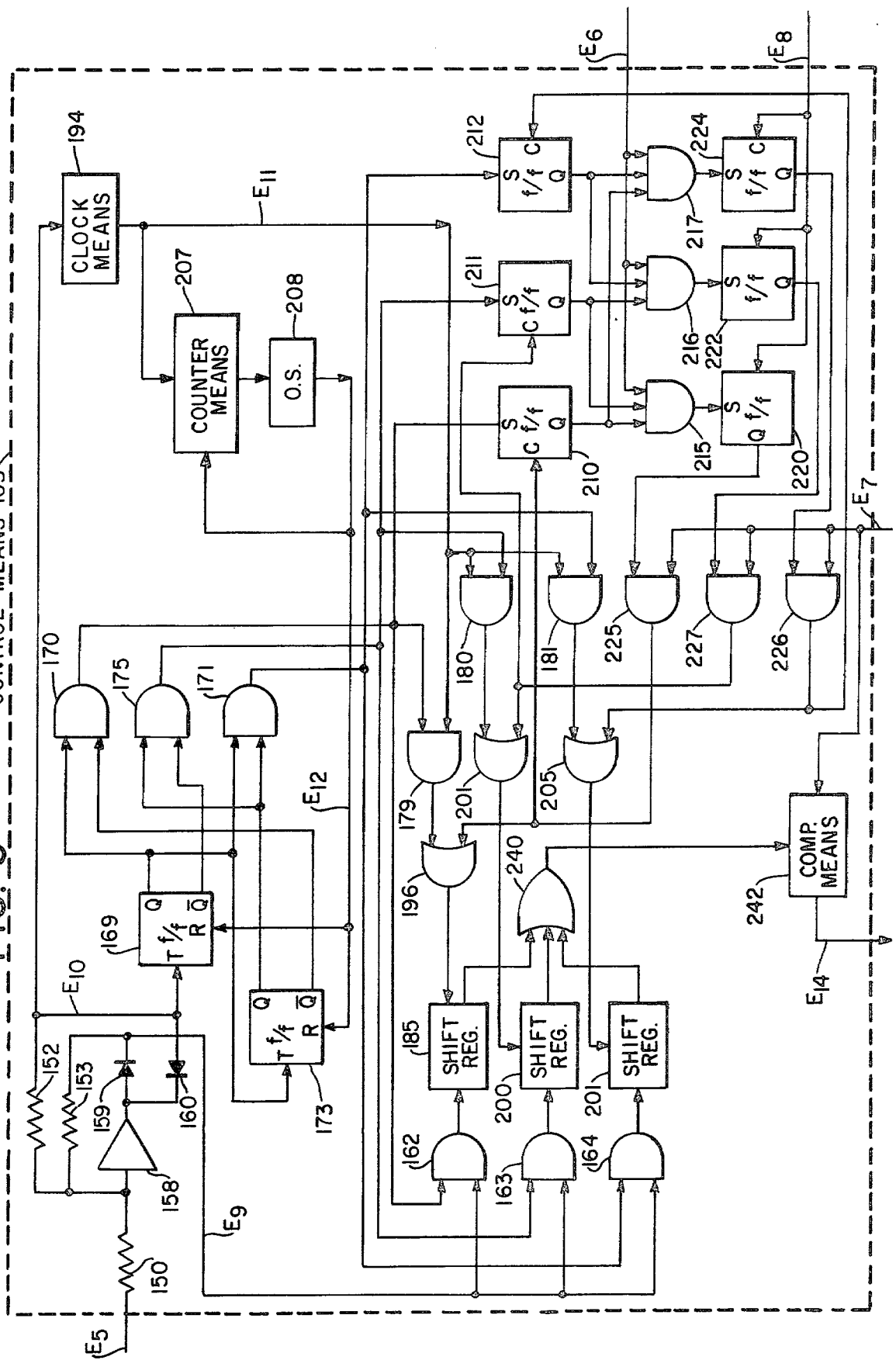

4,229,769

FACSIMILE SYSTEM

BACKGROUND OF THE INVENTION

1. Field of the Invention

The present invention relates to transmission systems in general and, more particularly, to a facsimile system.

SUMMARY OF THE INVENTION

A facsimile system includes a transmitter. The transmitter has a light source which provides pulses of light and scans an original copy. The pulses of light impinge on the copy during each scan. A light responsive device in the transmitter spacially related to the copy receives pulses of light from the copy in accordance with the copy, and provides electrical pulses on a one-for-one basis with the received light pulses. A circuit in the transmitter provides output signals in accordance with the electrical pulses from the device. A pulse source in the transmitter provides synchronization pulses. The system also includes a reciver which has a network receiving the output signals and the synchronization pulses. The network provides electrical data pulses in accordance with the received output signals and electrical synchronization pulses in accordance with the received synchronization pulses. A control circuit connected to the network provides a control signal in accordance with the data pulses from the network. A laser in the receiver scans light sensitive material and provides pulses of light which strike the material in accordance with the control signal. The receiver further includes apparatus for developing the material so as to provide a printed copy of the original copy.

The objects and advantages of the invention will appear more fully hereinafter, from a consideration of the detailed description which follows, taken together with the accompanying drawings wherein one embodiment is illustrated by way of example. It is to be expressly understood, however, that the drawings are for illustrative purposes only, and are not to be construed as defining the limits of the invention.

DESCRIPTION OF THE DRAWINGS

FIG. 1 is a simplified block diagram of a facsimile system.

FIG. 2 is a detailed block diagram of the transmitter, constructed in accordance with the present invention, shown in FIG. 1.

FIGS. 3A through 3F are graphical representations of pulse voltages occurring in the transmitter, shown in FIG. 1.

FIG. 4 is a graphical representation of the surface of an image sensor array means, shown in FIG. 5.

FIGS. 5 and 6 are detailed block diagrams of the image locator and the output means shown in FIG. 2.

FIGS. 8A through 8P are graphical representations of voltages occurring in the receiver during operation.

FIG. 9 is a detailed block diagram of the control means shown in FIG. 7.

DESCRIPTION OF THE INVENTION

Figure 6:
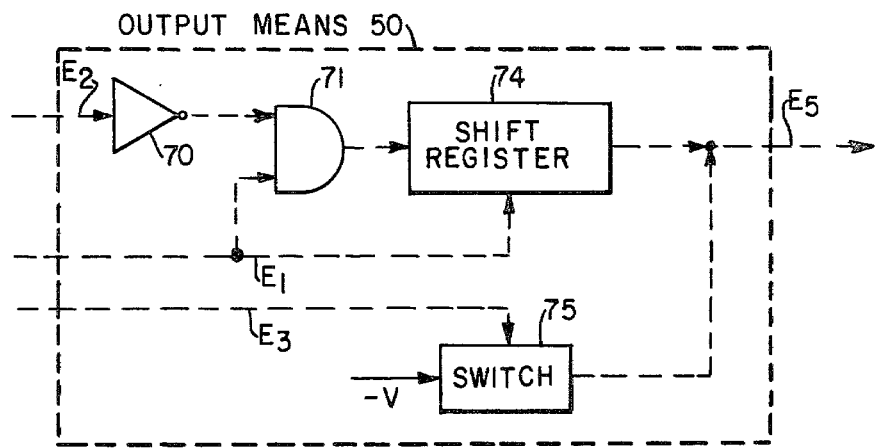

Referring to FIGS. 1 and 2, a transmitter 1 of a facsimile system provides a signal $E_5$ including positive data pulses corresponding to copy being copied and negative synchronization pulses.

Transmitter 1 includes a motor 2, when energized, rotating a multi-sided precision mirror 5 at a predetermined rate. A conventional type $H_eN_e$ laser 9 emits a continuous light beam 11 which passes through a lens element 15 to focus on point in a plane of mirror 5 which reflects beam 5 in a manner so that a reflection beam 17 will scan the surface of image sensor array means 20 (not shown in FIG. 1) of an image locator 22. Laser 9 may also be HeCd or HeSe laser.

Image locator 22, as hereinafter explained, controls the pulsing of another $H_eN_e$ laser 28 with a pulse signal $E_1$, shown in FIG. 3A. When pulsed, laser 28 provides a pulse of light 30, which passes through a lens 33 to strike the surface of mirror 5 at the same point that beam 11 strikes mirror 5. Mirror 5 reflects light pulses 30 as light pulses 37.

Light pulses 37 impinge on the subject matter to be copied, hereinafter referred to as copy 40, so that they are reflected by background areas of copy 40 as light pulses 42. Light pulses 37 are not reflected by the printed portions of copy 40, so that the absence of light pulses 42 can be correlated to the information on copy 40. Light pulses 42 impinge on signal means 45 after passing through lens 60. Signal means 45 provides electrical pulses $E_2$, as shown in FIG. 3B, on a one-for-one basis with received light pulses 42. Pulses $E_2$ are provided to output means 50 also receiving pulse $E_1$ and a start pulse $E_3$, shown in FIG. 3D, from image locator 22.

As shown in FIG. 1, copy 40 is stored on a drum 54 and passes over a wheel 55 before being subjected to light pulses 37. Copy 40 passes through a drive wheel 58 and another wheel 59. Drive wheel 58 is controlled by pulses $E_4$, shown in FIG. 3E, from image locator means 22 so that after each scanning operation copy 40 is moved a predetermined amount. Of course, it would be obvious to one skilled in the art that copy 40 need not be stored on the drum and provided by way of rollers. However, with the high speed copying of the present invention, a backlog of copy should be set up to take full advantage of the high speed capability.

Referring now to FIG. 4, image sensor array means 20 includes a plurality of image sensors 60. Image array means 20 may be similar to the linear image sensors manufactured by Fairchild Semiconductor Company as their part number CCD131. For purpose of discussion, the number of sensor elements 60 will be 1024, although there is no limit to the actual number of sensor elements 60.

Referring also to FIG. 5, due to the rotation of mirror 5, beam 17 will move across sensing elements 60 in a manner so that it will strike a first image sensor 60, labeled "start" and continue on illuminating the other image sensors 60 one at a time in sequence at a rate governed by the rotational speed of mirror 5. When beam 17 passes image sensor 60 labeled "end", the next side of mirror 5 causes beam 17 to scan image sensor array means 20 again. Thus a complete revolution of mirror 5 causes beam 17 to scan image sensor array means 20 n times.

When beam 17 illuminates the "start" image sensor 60, sensor 60 provides a pulse to a pulse shaping circuit 65 which provides a pulse $E_3$, shown in FIG. 3D. The "end" pulse is applied to a pulse shaping circuit which provides pulses $E_4$, shown in FIG. 3E. The outputs of image sensors 60, with the exception of the "start" and "end" image sensors 60, are applied to an OR gate 68 which provides pulses $E_1$. It would be obvious to one skilled in the art that OR gate 68 represents a plurality of OR gates connected to operate as a single OR gate.

Referring now to FIG. 6, pulses $E_2$ are applied to an inverter 70 which provides the inverted pulses as inhibiting pulses to an AND gate 71. Pulses $E_1$ are applied to AND gate 71 and to a shift register 74. AND gate 71 passes each pulses $E_1$ to register 74 unless an inverted pulse $E_2$ is present. The result is that the pulses provided by AND gate 71 are representative of the opaque areas of the copy and not the translucent areas. If inverter 70 and AND gate 71 were not used, receiver 80 would print the background. It would be obvious to one skilled in the art that inverter 70 and AND gate 71 can be omitted in transmitter 1 as long as the pulses are processed in receiver 80 to provide the complement of pulses $E_2$. Shift register 74 is shifted by pulses $E_1$ and enters the pulses from AND gate 71 as its content. Thus, at the end of a scan, the contents of shift register 74 corresponds to a representation of the scan in regard to opaque and translucent areas of copy 40. Shift register 74 provides digital signals which form part of signal $E_5$. A typical cycle of signal $E_5$ is shown in FIG. 3E. Signal $E_5$ may be conducted by wire or by radiation. For illustrative pulses, signal $E_5$ is discussed as being transmitted by wire. Pulses $E_3$ are applied to an electronic single pole throw switch 75 receiving a negative voltage $-V$. Switch 75 in response to pulse $E_3$ provides negative synthronization pulses which are incorporated as part of signal $E_5$.

Figure 7:
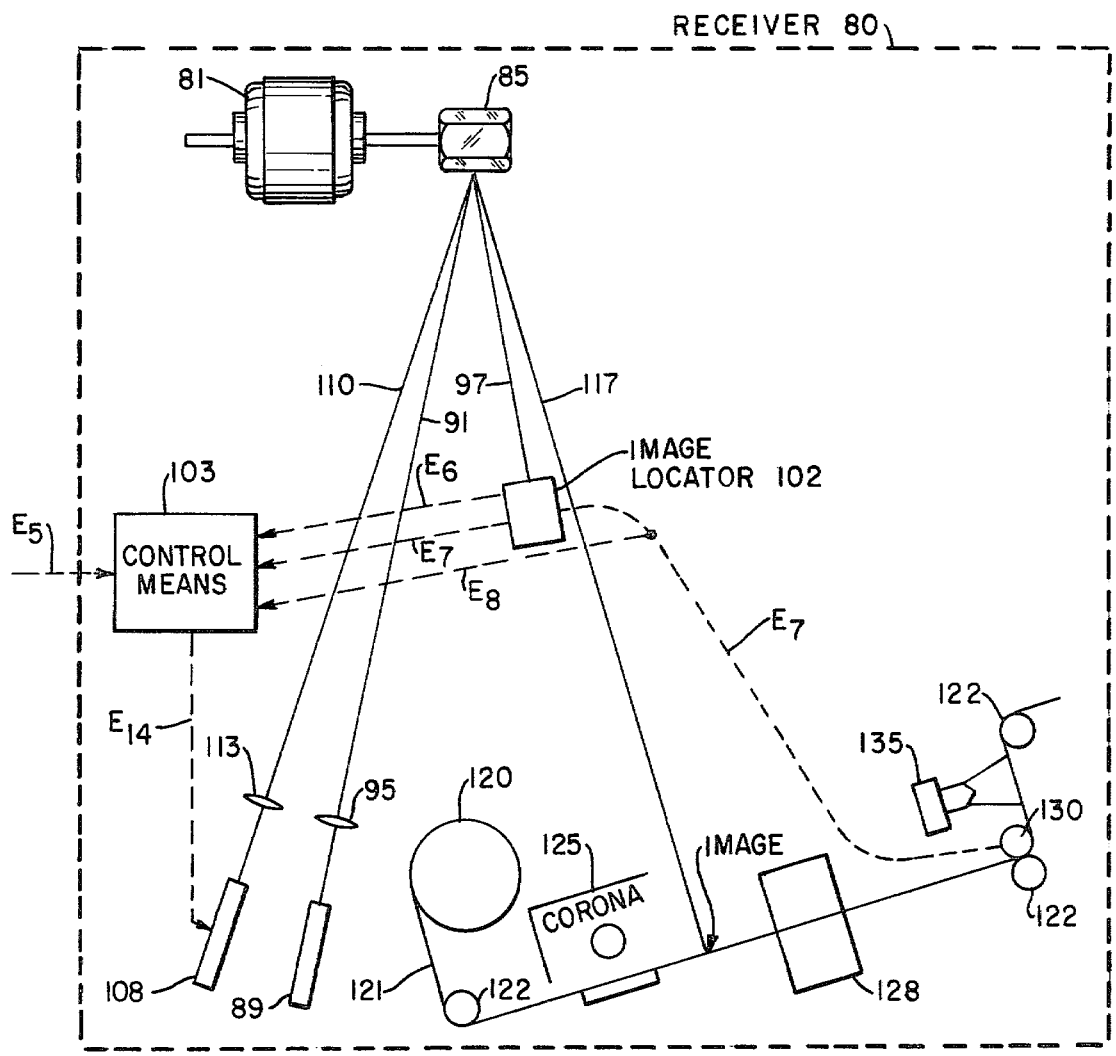
FIG. 7 is a partial block diagram and partial schematic of the receiver, constructed in accordance with the invention, shown in FIG. 1.

Referring to FIGS. 1 and 7, receiver 80 receives signal $E_5$ and provides a copy in accordance with signal $E_5$ as hereinafter explained, a motor 8 when energized rotates an eight sided precision mirror 5 at a predetermined rate. A laser 89 provides a light beam 91 which passes through a lens element 95 to focus on point in a plane of the mirror 85 which reflects beam 91 in a manner so that a reflection beam 97 will scan the surface of image sensor array means 102, which is the same as image sensor array means 20, of an image locator 102. Laser 89 may also be a HeCd or a HeSe laser.

Image locator 102 provides pulses $E_6$, $E_7$ and $E_8$ to control means 103, which, as hereinafter explained, controls the pulsing of another $H_eN_e$ laser 108 with a pulse signal $E_q$. When pulsed, laser 108 provides a pulse of light 110 which passes through a lens 113 to strike the surface of mirror 85 at the same point that beam 91 strikes mirror 85. Mirror 85 reflects light pulses 110 as light pulses 117.

It should be noted that the operation of elements 120 through 135 are of conventional nature. A supply 120 of transparent electrophotographic film 121 is provided. Film 121 moves past a roller 122 where the film is charged by a corona 125. Prior to charging, film 121 is insensitive to light. Light pulses 117 expose film 121 which continues through developer 128, past advance roller 130 controlled by drive pulses $E_7$ and a roller 122, where it is fixed by a radiant energy source 135, such as Xenon flash or a continuous infrared source. The developed and fixed film may then be further processed as desired, that is stored in rolls or cut into sheets.

Image locator 102 is similar to image locator 22. Pulses $E_6$, shown in FIG. 8I, are similar to pulses $E_3$, pulses $E_7$ shown in FIG. 8K, are similar to pulses $E_1$, and pulses $E_8$ shown in FIG. 8J are similar to pulses $E_4$.

Referring now to FIG. 9, signal $E_5$ is supplied to a pulse separation circuit in control means 103 including an input resistor 150, feedback resistors 152 and 153, amplifier 158 and diodes 159, 160. Diode 159 passes the data pulses as pulses $E_9$ while blocking the synchronizing pulses of signal $E_5$ while diode 160 blocks the data pulses of the amplified signal $E_5$ while passing the synchronizing pulses of the amplified signal $E_5$ are pulses $E_{10}$, shown in FIG. 8A. Although motors 2 and 82 are running at the same speed and mirror 5 and 85 are identical, in all probability synchronization pulse $E_{10}$ will not occur at the same time as pulses $E_6$. Therefore control means 103 includes circuitry for storing up to three cycles of data pulses $E_9$ and utilizing the pulses $E_6$ and $E_8$ to synchronize the data as follows.

Pulses $E_9$ are provided to AND gates 162, 163 and 164. In a first cycle, pulse $E_{10}$ triggers a flip-flop 169 to a set state. A flip-flop while in the set state will provide a Q output, shown in FIG. 8B, at a high logic level and the $\overline{Q}$ output, shown in FIG. 8C, at a low logic level. When in a clear state the Q output is at a low logic level and the $\overline{Q}$ output is at a high logic level. The Q output from flip-flop 169 is provided to AND gates 170, 171 and to the trigger input of another flip-flop 173. The $\overline{Q}$ output of flip-flop 169 is provided to an AND gate 175. The Q output, shown in FIG. 8D, of flip-flop 173 is provided to AND gates 171, 175 while the $\overline{Q}$ output, shown in FIG. 8E, is provided to AND gate 170. Thus, on the first pulse $E_{10}$, flip-flop 169 is in a set state and flip-flop 173 is in a clear state and only AND gate 170 is thereby enabled to provide a high logic output, shown in FIG. 8F, to AND gates 162, 179. The high logic level output from AND gate 170 enables AND gate 162 to pass pulses $E_9$ to a shift register 185.

Synchronizing pulse $E_{10}$ triggers clock means 194 to provide a predetermined number of pulses $E_{11}$ to AND gate 179. It is preferred that clock pulses $E_{11}$ from clock means 194 have substantially the same frequency as pulses $E_1$. Clock pulses $E_{11}$ pass through AND gate 179 and through an OR gate 196 to cause register 185 to shift in the pulses being provided by AND gate 162.

When the second pulse $E_{10}$ occurs, flip-flop 169 is triggered to a clear state causing its Q output to trigger flip-flop 173 to a set state. As a result, AND gate 170 is disabled and AND gate 175 is fully enabled. The high logic level output, shown in FIG. 8G, from AND gate 175 enables AND gates 163, 180. AND gate 163 passes pulses $E_9$ to shift register 200. The group of pulses $E_{11}$ from clock means 194, occurring in response to the second pulse $E_{10}$, passes through AND gate 180 and through an OR gate 201 and are provided to a register 200 to shift in the pulses being provided by AND gate 163.

The third synchronization pulse $E_{10}$ triggers flip-flop 169 back to a set state. At this time, AND gate 171 is enabled to provide a high logic level output, shown in FIG. 8H, to AND gates 164, 181 and 191. Again, clock means 194 is triggered to provide pulses $E_{11}$ to AND gate 181. Pulses $E_{11}$ pass through AND gate 181, which is fully enabled by the output of AND gate 171, and through an OR gate 205 to a shift register 201 to shift in the pulses being passed by AND gate 164.

Clock pulses $E_{11}$ are also applied to counter means 207. When the count in counter means 207 corresponds to three groups of pulses $E_{11}$, an output provided to a one-shot multivibrator 208 triggers one-shot 208. When triggered, one-shot 208 provides a reset pulse $E_{12}$, shown in FIG. 8L, to flip-flops 169, 173 and to counter means 207. Thus, AND gates 170, 171 and 175 will be repeatedly enabled as hereinbefore explained.

The outputs of AND gates 170, 171 and 175 are provided to the set inputs of flip-flops 210, 211 and 212, respectively. Each flip-flop is triggered to a set state when the output from its corresponding AND gate changes from a low logic level to a high logic level and provides a Q output at a high logic level while in the set state and at a low logic level while in the clear state. Flip-flops 210, 211 and 212 provide its Q outputs, shown in FIGS. 8M, 8N and 8P, respectively, to AND gates 215, 216 and 217, respectively. The Q outputs of flip-flops 210, 211 and 212 are also provided to AND gates 216, 215 and 217, respectively. Pulse $E_6$ is applied to AND gates 215, 217 and 216. The operation of flip-flops 210, 211 and 212 is such that each AND gate requires two flip-flops to be in a set state in order to pass pulse $E_6$.

Thus, when flip-flops 210 and 211 are in the set state, AND gate 215 passes pulse $E_6$ which triggers another flip-flop through 220. Similarly, AND gates 216 and 217 when they pass pulses $E_6$ will trigger flip-flops 222 and 224, respectively, to set states. The Q output from flip-flops 220, 222 and 224 are provided to AND gates 225, 226 and 227, respectively, which also receive signal $E_7$.

The operation of flip-flops 220, 222 and 224 are such that only one of those flip-flops is in a set state at one time. Again referring to the example of flip-flop 220 being triggered to a set state, AND gate 225 is enabled to pass signal $E_7$ which is passed through OR gate 196 to shift the contents of register 185. The first pulse of signal $E_7$ passed by AND gate 225 triggers flip-flop 210 to a clear state thereby preventing signal $E_6$ from setting flip-flop 220 until flip-flop 210 is again set by the output of AND gate 170. The passed pulses $E_7$ shift the contents of register 185 through an OR gate 240 to comparing means 242 also receiving signal $E_7$. When a pulse in signal $E_7$ coincides with a pulse being passed by OR gate 240, comparing means 242 provides a pulse $E_{14}$ to trigger laser means 108 as hereinbefore explained.

Similarly, AND gates 226 and 227 when enabled pass signals $E_7$ to OR gates 205 and 201, respectively, and through those gates to shift the contents of registers 200 and 201, respectively.

Thus, the output of OR gate 240 is the data portion of signal $E_5$ in synchronization with the pulses provided by image locator 102.

The device of the present invention as hereinbefore described is a high speed facsimile system using laser apparatus in a transmitter and in a receiver.

What is claimed is:

1. A facsimile system comprising a transmitter including scanning means for scanning an original copy and periodically providing pulses of light impinging the copy during the scan, light responsive means spacially related to the copy for receiving pulses of light from the copy and providing electrical pulses on a one-for-one basis with the received light pulses, sync means for providing synchronization pulses, means connected to the electrical pulse means and to the sync means for providing an output signal in accordance with the electrical pulses from the electrical pulse means and the synchronization pulses, and a receiver including receiver means for receiving the output signal and providing electrical data pulses and synchronization pulses in accordance with the received output signals, light sensitive material, control signal means connected to the receiver means for providing a control signal in accordance with the electrical pulses from receiver means, laser means for scanning the material and providing pulses of light which strike the material in accordance with the control signal, and means for developing the material so as to provide a printed copy of the original copy.

2. A system as described in claim 1 in which the laser means includes two lasers, a first continuous laser emitting a beam of light and a first pulse laser responsive to the control signal to provide the light pulses.

3. A system as described in claim 2 in which the laser means includes a first mirror having a plurality of faces and spacially related to the first continuous laser and to the first pulse laser so that the light from both lasers strike substantially the same point on a surface of the first mirror, and first rotating means connected to the first mirror for rotating the mirror at a first predetermined rate so that in effect the first pulse laser repeatedly scans the material in one direction, and the control signal means is spacially related to the first mirror and to the material so as to be repeatedly scanned by a reflected light beam from the first mirror in a manner so that the light beam scan corresponds to the scan of the material; and the receiver includes means connected to the control signal means for moving the material a predetermined distance after each scan so that unexposed material is available for exposure.

4. A system as described in claim 3 in which the control signal means includes a first plurality of image sensor means for being scanned by the beam of light, each image sensor means provides an electrical pulse when the beam of light passes over it, and circuit means connected to receiver means and to all the first plurality of image sensor means for providing the control signal in accordance with the pulses from the first plurality of image sensor means and the electrical pulses from the receiver means.

5. A system as described in claim 4, in which the scanning means comprises a second continuous laser emitting a beam of light, a second mirror having a plurality of faces is spacially related to the second continuous laser so that the light beam is reflected by the mirror when it is rotating in a manner so as to perform a scanning operation, second rotating means for rotating the second mirror at a second predetermined rate, image locator means spacially related to the copy and to the second mirror for providing energizing pulses in accordance with the scanning of the light beam from the second continuous laser, and a second pulse laser spacially related with the second continuous laser and the second mirror and connected to the image locator means provides pulses of light in response to the energizing pulses which strike the surface of the second mirror at the same point that the light beam from second continuous laser strikes and is reflected therefrom to impinge upon the copy.

6. A system as described in claim 5 in which the image locator means includes a second plurality of image sensors arranged so that the reflected light beam will scan across them, causing each image sensor to provide an electrical pulse, and gate means connected to the image sensors and to the second laser for providing the pulses from the image sensors as the control pulses to the second laser.

7. A system as described in claim 6 in which the image locator means further comprises two additional image sensors arranged with the other image sensors in the second plurality of image sensors so that one of them is a 'start' image sensor and the other is an 'end' image sensor, and means connected to the start and to the end image sensors for shaping the pulses to provide a 'start' pulse and an 'end' pulse, respectively; the sync means includes means connected to the pulse shaping means for providing a synchronization pulse of one polarity in response to a 'start' pulse; and the output signal means provides the sync pulse as part of the output signal and provides data pulses, having an opposite polarity to the synchronization pulses, in accordance with the pulses from the electrical pulse means as part of the output signal; and further comprising means connected to the pulse shaping means for changing the copy after each scan in response to the 'end' pulse so as to provide new copy for the next subsequent scan.

8. A system as described in claim 7 in which the receiver means includes separation means for receiving the output signal and separating the synchronization pulses and data pulses by polarity to provide two outputs having the same polarity, one output consisting of data pulses and the other output consisting of synchronization pulses; and the control signal means includes control pulse means connected to the separation means for providing control pulses in accordance with the synchronization pulses from the separation means, storage means connected to the separation means and to the control pulse means for storing the data pulses in accordance with the control pulses, recall means connected to the first plurality of image sensors and to the storage means for controlling the storage means to provide its contents as an output in accordance with pulses from the first plurality of image sensors, and comparing means connected to the storage means and to the first plurality of image sensors for comparing the output from the storage means with the pulses from the first plurality of the image sensors, except for the first and last pulse occurring during each scan of the first continuous laser, and providing a comparison signal as the control signal in accordance with the comparison.

9. A system as described in claim 8 in which the control pulse means includes first flip-flop means connected to the separation means for providing signals in accordance with the synchronization pulses from the separation means, and first switching means connected to the first flip-flop means for providing the control pulses in accordance with the signals from the flip-flop means.

10. A system as described in claim 9 in which the storing means includes a plurality of shift registers connected to the recall means, second switching means connected to the first switching means, to the shift registers and to the separation means and controlled by the control pulses to pass the data pulses from the separation means into the shift registers so that each shift register contains all of the data pulses associated with a corresponding scan of the copy until recalled by the recall means, an OR gate connected to all the shift registers and to the comparing means for passing the pulses provided by the shift registers to the comparing means as the output.

11. A system as described in claim 10 in which the contents of the shift registers are moved by shift pulses and the storage means includes shift pulse means connected to the separation means for providing storage shift pulses in accordance with the synchronization pulses from the separation means; the recall means provides recall shift pulses in accordance with the pulses from the first plurality of image sensors; and the control signal means includes third switching means connected to the shift pulse means, to the recall means and to the shift registers for passing the storage shift pulses or the recall shift pulses to a particular shift register.

12. A system as described in claim 11 in which the recall means includes means for delaying the recall pulses so that the recall pulses being provided to a particular shift register will not occur while the storage shift pulses are being applied to that register.

13. A system as described in claim 12 in which the delay means includes second flip-flop means connected to the first switching means, fourth switching means connected to the second flip-flop means and to the first plurality of image sensors for providing a pulse in accordance with signals provided by the second flip-flop means and the first pulse of each scan from the first plurality of image sensors, third flip-flop means connected to the fourth switching means and to the first plurality of image sensors for providing control signals in accordance with the pulses from the fourth switching means and the last pulse of each scan from the first plurality of image sensors, fifth switching means connected to the third flip-flop means, to the third switching means, and to the first plurality of image sensors for providing the pulses, from the first plurality of image sensors, with the exception of the first and last pulse of each scan, to the third switching means as the recall shift pulses.

14. A system as described in claim 13 in which the output signal means includes means connected to the electrical pulse means for providing the data pulses as the complement of the pulses from the electrical pulse means.

15. A system as described in claim 13 in which the receiving means includes means for converting the received data pulses to a pulse signal which is the complement of the received data pulses.

* * * * *